United States Patent [19]

Suzuki et al.

[11] 4,086,948

[45] May 2, 1978

[54] RADIAL TIRE FOR HEAVY LOAD VEHICLES

[75] Inventors: Yasuo Suzuki, Akigawa; Akira Tamura, Higashi-Murayama; Shigeru Sugihara, Fussa; Toshiro Tezuka, Higashi-Murayama, all of Japan

[73] Assignee: Bridgestone Tire Company Limited, Tokyo, Japan

[21] Appl. No.: 708,451

[22] Filed: Jul. 26, 1976

[30] Foreign Application Priority Data

Jul. 30, 1975 Japan .................................. 50-91975

[51] Int. Cl.² ............................................. B60C 9/00
[52] U.S. Cl. .................... 152/355; 152/354 R; 152/357 R; 152/362 CS; 152/374
[58] Field of Search ............... 152/354, 355, 357, 374, 152/362 CS, 361 R

[56] References Cited

U.S. PATENT DOCUMENTS

| 3,085,616 | 4/1963 | Smith et al. ............................ | 152/355 |
| 3,392,773 | 7/1968 | Warren et al. ......................... | 152/354 |
| 3,568,749 | 3/1971 | Menell et al. .......................... | 152/354 |
| 3,625,271 | 12/1971 | Hutch .................................... | 152/354 |
| 3,961,657 | 6/1976 | Chrobak ............................... | 152/355 |
| 3,964,533 | 6/1976 | Arimura et al. ....................... | 152/354 |

Primary Examiner—Robert B. Reeves
Assistant Examiner—Charles A. Marmor
Attorney, Agent, or Firm—Sughrue, Rothwell, Mion, Zinn and Macpeak

[57] ABSTRACT

A radial tire for heavy load vehicles such as light trucks, trucks, busses, super-large type construction vehicles, etc. is disclosed. The radial tire comprises a carcass ply composed of a steel cord ply and wound around a bead core from the inside toward the outside thereof to form a turn-up portion. The upper end of the turn-up portion is upwardly extended to a position located between a point passing over the maximum width point of the carcass ply expanded by applying an internal pressure to the tire and a point where a normal drawn perpendicular from a hump to the carcass ply crosses with the carcass ply. The turn-up portion of the carcass ply is separated from the carcass ply by means of a soft rubber layer composed of rubber having a Shore A hardness which is smaller than a Shore A hardness of a coating rubber of the carcass ply and a 300% modulus of elasticity which is 50% to 85% of a 300% modulus of elasticity of the coating rubber of the carcass ply.

6 Claims, 7 Drawing Figures

FIG.1

FIG.2
PRIOR ART Tire A

FIG.3
PRIOR ART Tire B

FIG.4
PRIOR ART Tire C

RADIAL TIRE FOR HEAVY LOAD VEHICLES

This invention relates to radial tires for heavy load vehicles and more particularly to a radial tire for heavy load vehicles, which employs a carcass ply and a chafer both composed of a steel cord ply and which has improved load bearing ability.

In general, a radial tire has a special carcass construction so that the generation of heat is small and the wear resistant property is excellent. Radial tires have widely been used instead of conventional bias tires.

The radial tire has been developed as a tire for passanger vehicles, and has recently been developed as a tire for heavy load vehicles. At present, the radial tire has seriously been considered to be used in fields of not only light trucks, trucks, busses (hereinafter will be abbreviated as TB tires), but also super-large type construction vehicles (hereinafter will be abbreviated as OR tires).

In all of the above mentioned cases, the volume of tire to which is applied the internal pressure becomes large as the tire becomes large in size and is used under heavier load condition. In addition, the internal pressure per se becomes particularly higher. For this purpose, in the conventional bias tire the number of carcass plies has increased. The radial tire, however, preferably makes use of one carcass ply in order to significantly exhibit its merit.

As a result, radial tires for large type heavy load vehicles larger than the TB tire make use of a carcass ply composed of a steel cord ply which is high in strength, the strength of the steel cord ply being adjusted, if necessary.

In the radial tire, in practice particularly used for large type heavy load vehicles, its side portion becomes considerably deflected under high load condition, and as a result, its bead portion or side portion is frequently damaged. Many attempts inclusive of using a chafer composed of a steel cord ply as a reinforcing layer so as to increase rigidity of the bead portion and hence reduce its deflection have been made, but no satisfactory result has been obtained.

These proposed improvements mainly consist of a reinforced bead construction in which a turn-up portion of the carcass ply is surrounded by a steel cord chafer (hereinafter will be called as wire chafer). However, the wire chafer and the turn-up portion of the carcass ply interact each other to induce separation failure at the upper end of the turn-up portion of the carcass ply or at the upper end of the turn-up portion of the wire chafer facing the side portion. This separation failure rapidly grows and is continuous to frequently induce tire breakage.

In an OR tire used for travel on off-roads on which sharp stones are scattered, in order to prevent its side portion from being subjected to cut failures, an attempt has been made to use a side protection ply (hereinafter will be abbreviated as a side ply) which is made separate from the carcass ply and superimposed about the carcass ply and embedded in substantially the total area of the side portion of the tire. If such side ply is superimposed about the turn-up portion of the carcass ply, the rigidity of the side portion is suddenly changed at the upper end of the turn-up portion of the carcass ply. As a result, the side ply becomes repeatedly bent at the upper end of the turn-up portion of the carcass ply every time the tire is rotated, thereby resulting in fatigue failure of the tire. This tendency becomes conspicuous when the cords of the side ply are arranged near the radial surface or when the rigidity of the cords of the side ply is large.

The side ply serves to prevent side cut failure of the tire. For this purpose, the cords of the side ply are required to be large in diameter and high in rigidity thus inducing fatigue failure of the tire.

In addition, relative displacement of the side ply results from the movement of the side ply relative to the turn-up portion of the carcass ply followed by the rotation of tire and the tension subjected to the side ply. Such relative displacement of the side ply results in a shearing strain between the side ply and the carcass ply. The shearing strain can itself lead to occurrence of tire separation failure. The side ply which makes use of cords having large diameter and high rigidity increases its tendency to lead to tire separation failure.

As can be seen from the above, the side ply for protecting the side portion of the tire use steel cords or textile cords which are smaller in diameter and lower in rigidity than those of the carcass ply.

As a result, the conventional radial tire could not obtain its excellent high cut resistant property and durability.

An object of the invention, therefore, is to provide a radial tire for heavy load vehicles, which can eliminate the above mentioned disadvantage inherent to the use of the side ply and which can remarkably improve the load bearing ability, durability of the bead portion and cut resistant property of the side portion of the radial tire.

A feature of the invention is the provision of a radial tire for heavy load vehicles comprising a crown portion for forming a tread, and a pair of side portions for supporting the crown portion. A pair of bead portions each having a bead core are used for mounting the root of each side portion on a tire rim. The tire has a carcass ply composed of a steel cord ply and extending from the crown portion through both the side portions to both the bead portions; the carcass ply being wound around the bead core from the inside toward the outside thereof to form a turn-up portion. A chafer is composed of a steel cord ply and superimposed about the turn-up portion of the carcass ply, the chafer being wound around the bead core from the inside toward the outside thereof to reinforce the bead portion. The tire further comprises a plurality of inextensible belts superimposed about the carcass ply and reinforcing the crown portion.

The improved tire is characterized by upwardly extending the upper end of the turn-up portion of the carcass ply to a position located between a point passing over the maximum width point of the carcass ply expanded by applying an internal pressure to the tire and a point where a normal drawn perpendicular from a hump to the carcass ply crosses with the carcass ply and reinforcing the side portion of the tire, and by separating the turn-up portion of the carcass ply from the carcass ply by means of a soft rubber layer composed of rubber having a Shore A hardness which is smaller than a Shore A hardness of a coating rubber of the carcass ply and a 300% modulus of elasticity which is 50% to 85% of a 300% modulus of elasticity of the coating rubber of the carcass ply.

That is, in the present invention, it is necessary that the height of the upper end of the turn-up portion of the carcass ply composed of steel cords is extended over the maximum width point to a point nearer to the belt so as to reinforce the side portion and that the wire chafer for reinforcing the bead portion at the root thereof is terminated at a point nearer to the bead than the maximum width point of the carcass line, both the upper ends of the turn-up portions of the carcass ply and chafer being separated from the carcass ply by means of a soft rubber layer.

In the prior art techniques, extending the upper end of the turn-up portion of the carcass ply up to a point near the maximum width point of the carcass line has been proposed. But, such a technique is not capable of improving the cut resistant property of the side portion because of the following reasons.

The inventors have measured strains in the radial direction on various radial tires for heavy load vehicles produced when the tires are applied to the internal pressure and compared such surface strains with each other and recognized the following three facts. First, these surface strains show substantially the same tendency as that of internal strain. The minimum position of the surface strain of one tire construction is more or less different from that of another tire construction. But, in general, these surface strains are produced at a point located between the rim flange and a position which is nearer to the bead portion than the maximum width point of the carcass line. That is, such minimum position is produced at near $\frac{5}{8}$ H of a height H of the carcass ply measured from a base line defined by a surface at which a bead heel makes contact with the rim on a section on a surface passing the equatorial line of the tire. Secondly, the minimum position of the surface strain is produced at a position between a point which is higher by at least 1/20 H than the maximum width point of the carcass ply and a point where a normal drawn perpendicular from a hump where a portion near the tire shoulder is maximum in thickness to the carcass line crosses with the carcass line, that is, a point which is about $\frac{3}{4}$ H. Finally, the minimum position of the strain in the radial direction is substantially constant irrespective of the change of loads.

In general, in radial tires, the strain in the radial direction acts on cords of the carcass arranged in the radial direction of the tire or inclined at a very small angle with respect to the radial direction, or on cords of the chafer. Such strain in the radial direction gives repeatedly picking action to the cord ends of the carcass or chafer and causes the cord ends to separate from the surrounding rubber. As a result, the upper ends of the turn-up portion of the carcass ply and wire chafer must be terminated at a position where the strain in the radial direction is small.

The invention is based on the above described recognition and can effectively reinforce the side portion of the radial tire for heavy load vehicles by extreme prolonging of the turn-up portion of the carcass ply.

The invention will now be described in greater detail with reference to the accompanying drawings, wherein.

Figure 1:
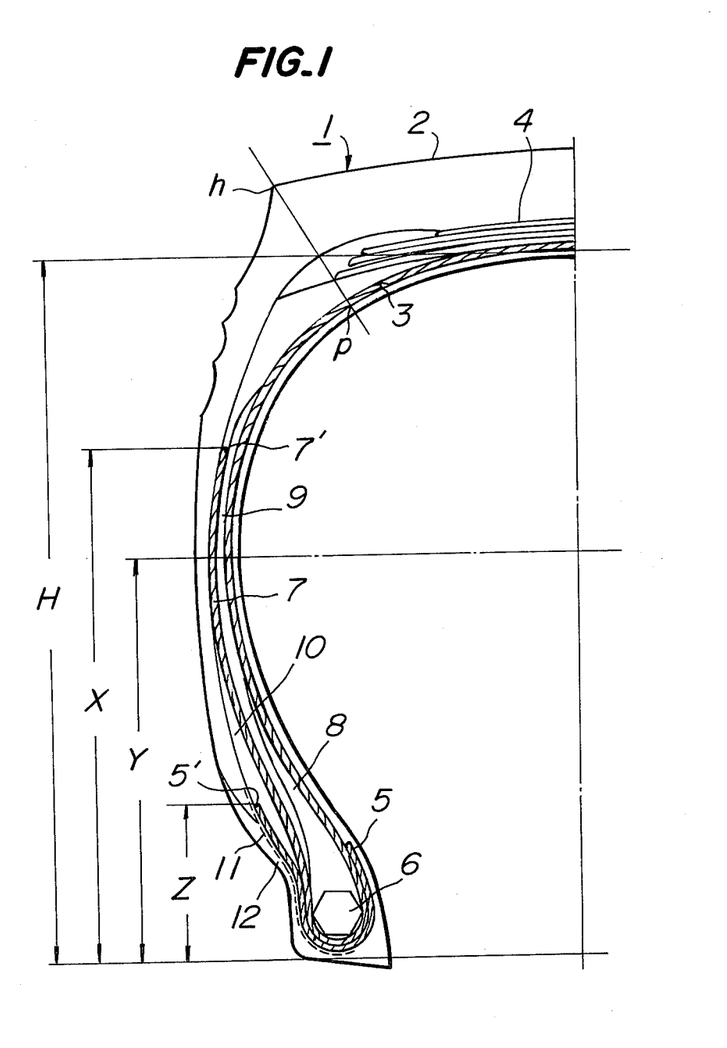
FIG. 1 is a cross-sectional view of one-half of a tire according to the invention showing one embodiment thereof.
Figure 2:
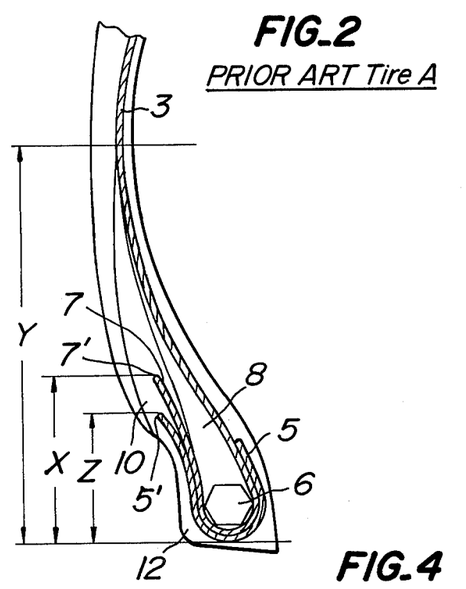
FIGS. 2, 3 and 4 are cross-sectional views of essential parts of prior art tires shown for the comparison sake.
Figure 3:
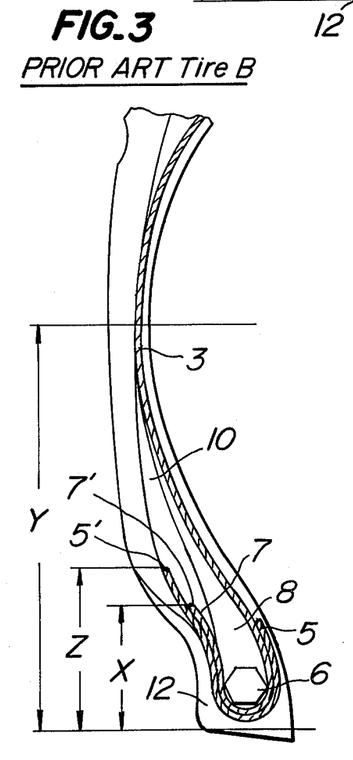
Figure 4:
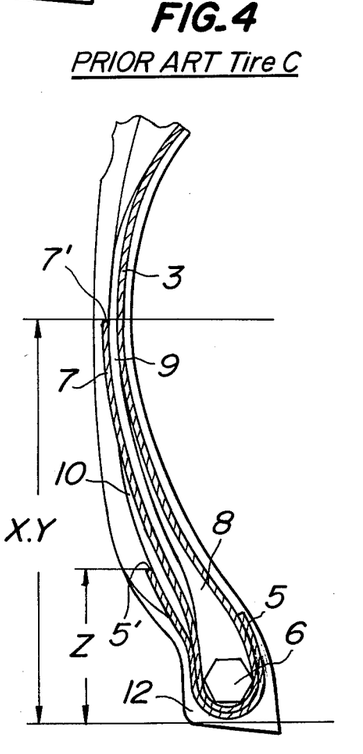

In FIG. 1 is shown in section a basic embodiment of the radial tire according to the invention, while in FIGS. 2 to 4 are shown in section essential parts of three types of the prior art radial tire. All of these tires have a size TB 10.00–20, 14 PR. In each tire 1, between a tread rubber layer 2 and a toroidal-shaped carcass ply 3 composed of steel cords are arranged four inextensible belts 4 composed of steel cords to reinforce a crown portion.

The carcass ply 3 has a strand construction of $1\times3+5\times6+1$, a cord diameter of 1.2 mm, a filament diameter of 0.15 mm, a twisting pitch of core of 8.65 mm(Z), a twisting pitch of strand of 13.3 mm(Z), a twisting pitch of cord of 12.7 mm(S) and a twisting pitch of spiral of 5.0 mm(Z), and a cord strength of at least 165 Kg. In addition, the inextensible belt 4 has a strand construction of $1\times3+6$, a cord diameter of 1.21 mm, a cord filament diameter of 0.2 mm, a strand filament diameter of 0.38 mm, a twisting pitch of core of 9.5 mm(Z), a twisting pitch of cord of 14.0 mm(S), and a cord strength of at least 165 Kg.

The carcass ply 3 is composed of rubberized cord layers containing cords each inclined at an angle of 90° with respect to the equatorial line of the tire. These are five cords per 25 mm at the center portion of the tire.

The inextensible belt 4 is composed of an inner layer interposed between two normal lines drawn perpendicular from a hump $h$ to the carcass line, two intermediate layers superimposed about the inner layer, the outer layer of which being slightly narrower in width than the inner layer thereof, and an outer layer superimposed about the intermediate layers and facing the tread rubber layer 2, the outer layer having a width which is slightly larger than one half of the largest width of the inner layer. The cords in the inner, intermediate and outer layers are inclined at angles of 60°, 20°, 20° and 40°, respectively, with respect to the equatorial line of the tire alternately in the order from the inner layer to the outer layer and alternatly run in opposite directions. There are eight cords per 25 mm measured at right angles to the cord direction.

A wire chafer 5 for reinforcing the root of the side portion of the tire and reinforcing also the bead portion is composed of a rubberized fabric containing steel cords which are the same as those used in the carcass ply 3. These cords are inclined at 30° with respect to the equatorial line of the tire.

A bead core 6 is composed of a bundle of rubberized wires each having a diameter of 0.94 mm and made hexagonal in section by means of a coating rubber.

In the embodiment shown in FIG. 1, a turn-up portion 7 of the carcass ply 3 is extended along the toroidal-shaped carcass line toward the hump $h$ and the height X of the turn-up portion is made 0.722 H. The height Y of the maximum width point of the carcass line is 0.57 H.

As a result, the upper end 7' of the turn-up portion 7 of the carcass ply 3 is located at a position between a point passing over the maximum width point of the carcass ply 3 expanded by applying an internal pressure to the tire and a point P where a normal drawn perpendicular from the hump $h$ to the carcass line 3 crosses with the carcass line 3.

Between the turn-up portion 7 of the carcass ply 3 and the carcass ply 3 are arranged a hard stiffner 8 (Shore A hardness 80°) and a soft rubber layer 9 (Shore A hardness 60°). The hard stiffner 8 is disposed directly over the bead core 6 and having a thickness which is gradually decreased along the carcass line. The soft rubber layer 9 is overlapped with the hard stiffner 8 and extended along the inner surface of the turn-up portion 7 to a point slightly passing over the upper end 7' of the turn-up portion of the carcass ply 3, thereby separating the upper end 7' of the turn-up portion 7 of the carcass ply 3 from the carcass ply 3.

A wire chafer 3 together with the carcass ply 3 are wound about the bead core 6 from the inside toward the outside thereof and the upper end 5' of the turn-up portion of the wire chafer 5 is separated from the turn-up portion 7 of the carcass ply 3. Between the turn-up portion 7 of the carcass ply 3 and the turn-up portion of the wire chafer 5 is sandwiched a soft pad rubber layer 10 (Shore A hardness 60°). The wire chafer 5 is surrounded by a textile chafer 11 preferably composed of nylon cords and extending up to a height which passes over the upper end 5' of the turn-up portion of the wire chafer 5. A rubber chafer 12 having an excellent wear resistant property is superimposed about the textile chafer 11.

The textile chafer 11 is composed of a rubberized bias fabric containing cords inclined at an angle of 30° with respect to the equatorial line of the tire. The textile chafer 11 serves to prevent a separation failure at the upper end 5' of the turn-up portion of the wire chafer 5.

In the present embodiment, the height Z of the upper end 5' of the turn-up portion of the wire chafer 5 is 0.225 H.

In a prior art tire A shown in FIG. 2 for purposes of comparison, the height X of the upper end 7' of the turn-up portion 7 of the carcass ply 3 is 0.247 H and the height Z of the upper end 5' of the turn-up portion of the wire chafer 5 is 0.2 H, any other dimensions of the prior art tire A shown in FIG. 2 being the same as those of the tire according to the invention shown in FIG. 1.

In a prior art tire B shown in FIG. 3 for comparison, the height X of the upper end 7' of the turn-up portion 7 of the carcass ply 3 is made lower than the height Z of the upper end 5' of the turn-up portion of the wire chafer 5 and the turn-up portion 7 abuts against the turn-up portion of the wire chafer 5. The height X is 0.17 H and the height Z is 0.225 H. Any other dimensions of the prior art tire B shown in FIG. 3 are substantially the same as those of the tire A according to the invention shown in FIG. 1 and of the prior art tire shown in FIG. 2.

In a prior art tire C shown in FIG. 4 for comparison, the turn-up portion 7 of the carcass ply 3 is made slightly long to make the height X of the upper end 7' of the turn-up portion 7 of the carcass ply 3 equal to the height Y=0.57 H of the maximum width point of the carcass line. Any other dimensions of the prior art tire C shown in FIG. 4 are the same as those of the tire according to the invention shown in FIG. 1.

The static strain characteristics of the tire according to the invention shown in FIG. 1 and of the prior art tires A, B, C shown in FIGS. 2, 3, 4 will now be described.

The tire failure particularly induced at that portion of the tire which is extended from the bead portion to the side portion predominantly occurs due to mechanical fatigue of the tire. It is considered that strains repeatedly produced due to three external forces, i.e. internal pressure applied to the tire, load and traction subjected to the tire can itself lead to the tire failure. So, whether or not the tire construction is good can be discriminated by measuring strain occurred at that portion of the tire which is extended from the bead portion to the side portion of the tire.

Figure 5:
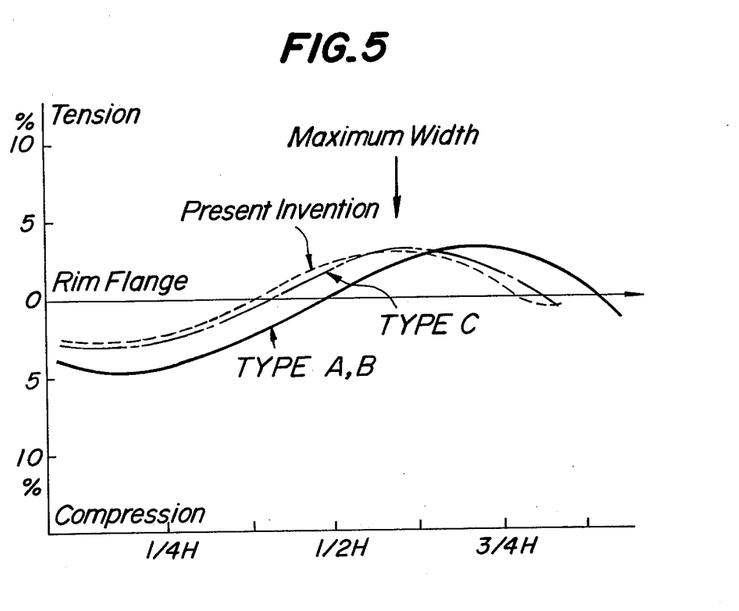
FIG. 5 is a graph illustrating distribution of surface strain in radial direction along a height of a carcass ply.

In FIG. 5 shows the results from measurement of the surface strain produced in the tire according to the invention and the prior art tires A, B, C under 100% load.

The strain in radial direction produced in the upper end 7' of the turn-up portion 7 of the carcass ply 3 and also produced in the upper end 5' of the turn-up portion of the wire chafer 5 was measured and the result obtained is shown in the following Table.

|  | Under normal internal pressure | | Under 100% load | |
| --- | --- | --- | --- | --- |
|  | At upper end of turn-up portion of carcass ply | At upper end of turn-up portion of wire chafer | At upper end of turn-up portion of carcass ply | At upper end of turn-up portion of wire chafer |
| Present invention | +0.7 | −1.0 | −1.8 | −4.5 |
| Comparison tire A | −2 | −1.2 | −11 | −8 |
| Comparison tire B | — | −1.2 | — | −10 |
| Comparison tire C | +6.5 | −1.0 | +6.5 | −51 |

+denotes tensile strain (%)
−denotes compressive strain (%)

Figure 6:
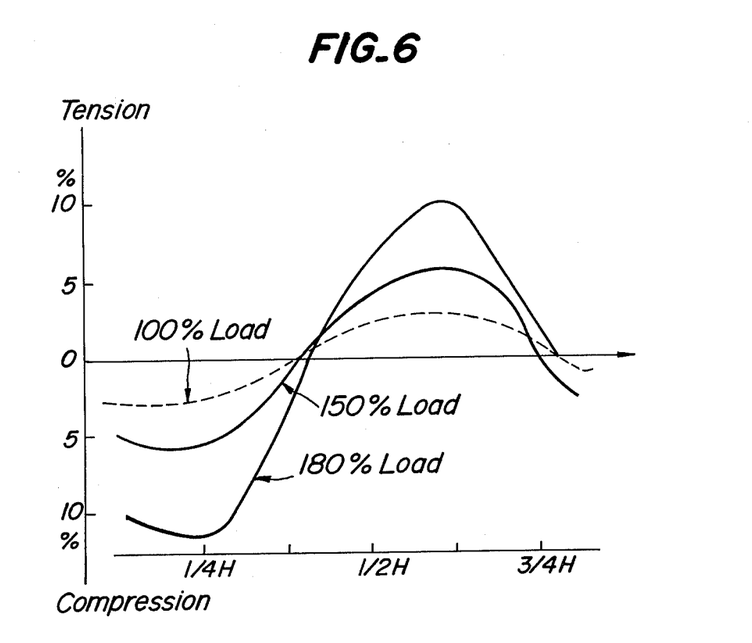
FIG. 6 is a graph illustrating change of the surface strain shown in FIG. 5 with load changed as parameter.

As can be seen from FIG. 5, the surface strain becomes more or less different in dependence with the configuration and construction of pneumatic tires, but the surface strain shows substantially the same tendency. Experimental tests have demonstrated that the minimum position of the surface strain subjected to the embodiment of the tire according to the invention is not substantially changed even when the load is increased as shown in FIG. 6.

As described above, the minimum position of the strain in the radial direction which can be guessed by the result of measurement on the surface strain is located at a position nearer to the hump $h$ than the maximum width point of the carcass line. More specifically, the minimum position of the strain is produced at a position between a point nearer to the hump $h$ by 1/20 H than the maximum width point of the carcass ply and a point P where a normal drawn perpendicular from the hump $h$ to the carcass line crosses with the carcass line. As a result, the upper end 7' of the turn-up portion 7 of the carcass line 3 is extended up to the above mentioned position. The use of the measures described ensures increase of load-bearing ability and durability of a radial tire for heavy load vehicles and improvement in cut resistant property of the side portion of the tire.

The turn-up portion 7 of the carcass ply 3 of the tire according to the invention is different in function from a prior art side protect ply composed of a carcass ply merely arranged between rubber layers of the side portion for the purpose of preventing the side cut failure. This is because of the fact that such prior art side protect ply is not made integral with the carcass ply and is not wound about the bead core. As a result, when an internal pressure is applied to the tire or the tire is subjected to load, a considerably large strain is produced at both upper and lower ends of the side protect ply. On the contrary, the turn-up portion 7 of the carcass ply 3 whose upper end 7' is located at the above mentioned position according to the invention is subjected to strain which is far milder than that subjected to the prior art side protect ply.

The durability of the bead portion of the tire according to the invention was compared with those of the prior art tires A, B, C with the aid of an indoor drum test.

A testing drum has an outer diameter of 5 m. The test was effected under the following conditions. The tire was pressurized to an internal pressure of 7.0 Kg/cm$^2$, the speed was made 50 Km/hr and the load was increased in a stepwise manner from a 150% load for 72 hours, 170% load for 72 hours up to 190% tire failure load. The tread of the tire being tested was buffed to previously reduce the thickness of the tread in order to exclude the influence due to tire failure induced in the crown portion.

The result obtained from the experimental tests is shown in the following table.

| | Tire failure started | State of tire failure | Tire broken-out | State of tire breakage |
|---|---|---|---|---|
| Tire according to the invention | 7,700Km | Upper end of turn-up portion of wire chafer was separated | 11,300km | Upper end of turn-up portion of wire chafer was cut and tire was punctured |
| Prior art tire A | 7,200Km | Upper end of turn-up portion of carcass ply was separated | 8,400Km | Upper ends of both turn-up portions of wire chafer and carcass ply were broken and tire was punctured |
| Prior art tire B | 6,700Km | Upper end of turn-up portion of wire chafer was separated | 7,800Km | Upper ends of both turn-up portions of wire chafer and carcass ply were broken and tire were punctured |
| Prior art tire C | 7,450Km | Upper ends of both turn-up portions of wire chafer and carcass ply were separated | 9,950Km | Upper ends of both turn-up portions of carcass ply and wire chafer were injured and tire was continuously punctured |

When a tire for heavy load vehicles is used for off-road vehicles, it is desirous that the tire can travel for a long distance from occurrence of failure to breakage of the tire. This distance over which the tire can travel until it becomes broken means the life of tire.

In all of the prior art tires A, B and C, the tire life was expired when the upper end of the turn-up portion of the carcass ply became broken. On the contrary, the life of the tire according to the invention was expired when the upper end 5' of the wire chafer became cut, so that the life until the tire becomes broken was significantly extended.

In accordance with the tire according to the invention, the carcass ply is deflected under load when the tire is used and the ply cord is subjected to repeated strain in circumferential direction and hence adjacent cords are separated one from the other. This strain in circumferential direction becomes maximum at near the maximum width point of the carcass line. This strain in circumferential direction results in an interlayer shearing stress acting between the wire chafer and the carcass ply. The influence of this strain in circumferential direction is relatively small at the root of the side portion. In accordance with the invention, therefore, the upper end 5' of the wire chafer 5 is located at this root of the side portion.

It is desirous that the height of the upper end 5' of the turn-up portion of the wire chafer 5 is made higher than the rim flange, but is lower than H for the purpose of effecting a protection from chafing against the rim.

But, it is not preferable to locate the upper end 5' of the turn-up portion of the wire chafer 5 within the rim flange. This is because the height of the upper end 5' becomes so low that there is a risk of the wire chafer 5 being slidably dropped out of the bead. As a result, the upper end 5' of the turn-up portion of the wire chafer 5 could not be located at the position where the strain in the radial direction is minimum.

As a result, the upper end 5' of the turn-up portion of the wire chafer 5 is required to be separated from the turn-up portion 7 of the carcass ply by means of the pad rubber layer 10.

The extension of the running distance of the tire until separation failure occurs at the upper end of the turn-up portion of the wire chafer results in an extension of the life of the OR tire. This is because the separation failure occurred at the upper end of the turn-up portion of the wire chafer accelerates breaking-up failure of the carcass ply.

As described above, the pad rubber layer 10 serves to reduce the relative displacement between the upper end 5' of the turn-up portion of the wire chafer 5 and the turn-up portion 7 of the carcass ply 3 and separate the wire chafer 5 from the turn-up portion 7 of the carcass ply 3 for the purpose of preventing the separation failure at the upper end 5' of the turn-up portion of the wire chafer 5. As a result, care must be taken in the case of selecting the quality of rubber of the pad rubber layer 10.

Experimental tests have indicated that the pad rubber layer 10 should be composed of rubber having such quality that its Shore A hardness is smaller than that of a coating rubber of the carcass ply 3 by 10° to 25° and its 300% modulus of elasticity is 50% to 85%, preferably 60% to 80% of that of the same coating rubber.

In addition, the soft stiffner 9 for separating the upper end 7' of the turn-up portion 7 of the carcass ply 3 from the carcass ply 3 is preferably composed of rubber which is substantially equal in quality to the above mentioned pad rubber layer 10. The hard stiffner 8 must be harder than surrounding rubber. Experimental tests have produced good results when the Shore A hardness of the hard stiffner 8 is higher than that of the soft rubber layer by at least 10°, preferably at least 15° and when 50% modulus of elasticity of the hard stiffner 8 is at least two times higher than that of the soft rubber layer.

Figure 7:
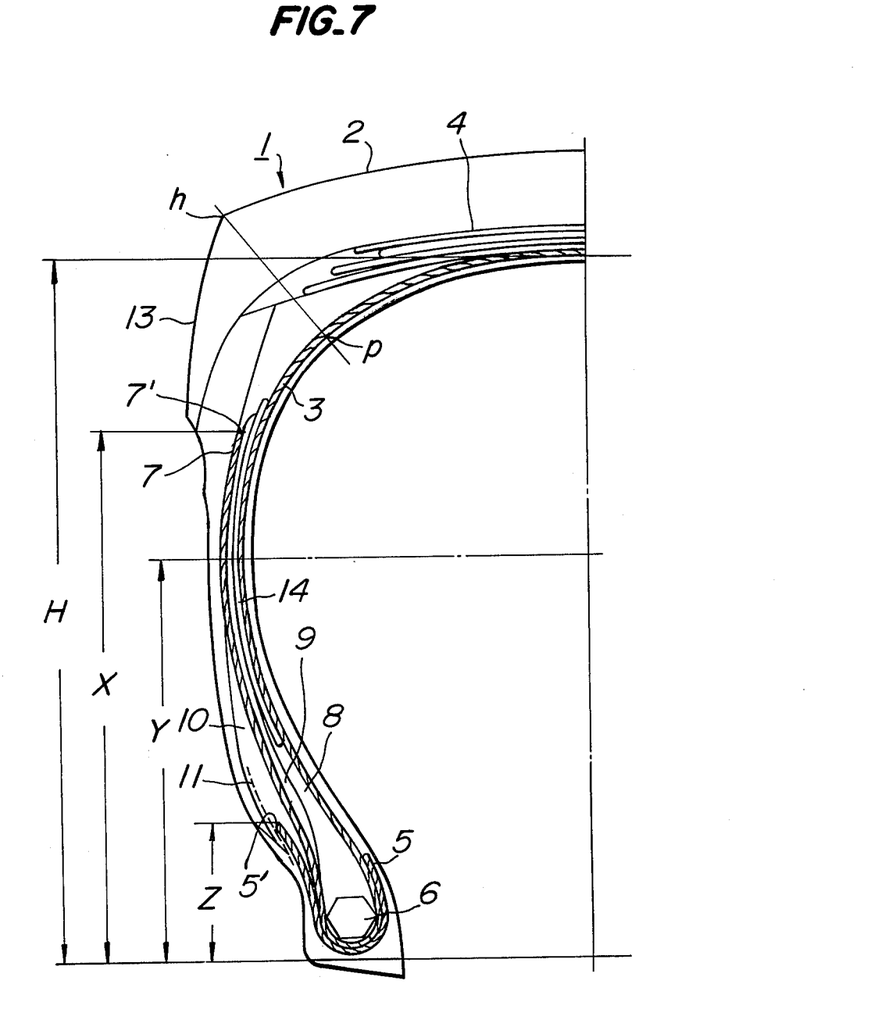
FIG. 7 is a cross-sectional view of one-half of a tire according to the invention showing another embodiment thereof applied to an OR tire.

In FIG. 7 is shown another embodiment of the tire according to the invention which is suitable as OR tires.

It is known that OR tires are subjected to heavy load. The OR tire, however, is required to prevent its side wall from breaking. In the present embodiment, in order to satisfy such requirement, a projection 13 is provided for the side tread and in addition between the carcass ply 3 and its turn-up portion 7 is sandwiched a side ply 14 which serves to protect the side wall. The tire shown in FIG. 7 has a size of OR 1800 R 33. 32 PLY T/L E-3.

In the present embodiment, between the tread rubber layer 2 and the carcass ply 3 is interposed an inextensible belt 4 composed of four steel cord plies, the four steel cords being extended in substantially parallel with a rotational axis of the tire and embedded in the tire along its circumferential direction.

The belt 4 has a strand construction of 1×3+9+9×4+1, a cord diameter of 1.72 mm, a filament diameter of 0.175 mm, a twisting pitch of core of 9.5 mm(S), a twisting pitch of strand of 9.5 mm(S), a twisting pitch of cord of 18.5 mm(Z) and a twisting pitch of spiral of 2.5 mm(S), and strength of the cord of at least 310 Kg. All of these cords are alternately inclined at 23° with respect to the equatorial line of the tire and are alternately extended in opposite directions in the order from the carcass ply 3 toward the tread rubber layer 2.

The carcass ply 3 is composed of one steel cord which is the same as that of the inextensible belt 4, the cord being inclined at an angle of 90° with respect to the equatorial line of the tire. The carcass ply 3 is wound about a pair of bead cores 6 from the inside toward the outside thereof and secured to the bead core 6, the bead core 6 being hexagonal in section. The turn-up portion 7 of the carcass ply 3 is extended along the carcass ply 3 toward the hump $h$. The bead portion is reinforced by a wire chafer 5 superimposed about the carcass ply 3 and wound about the bead core 6 together with the carcass ply 3. The wire chafer 5 is composed of one steel cord ply, the cords of which being lie in a radial plane and inclined at an angle of 30° with respect to the equatorial line of the tire. A side ply 14 interposed between the carcass ply 3 and its turn-up portion 7 is abutted against the carcass ply 3. In this case, the side ply 14 may be abutted through a coating rubber against the carcass ply 3. The side ply 14 is composed of one steel cord ply, the cords being be in a radial plane and inclined at an angle of 90° with respect to the equatorial line of the tire. The side ply 14 has a strand construction of 3×7, cord diameter of 1.6 mm, filament diameter of 0.23 mm, twisting pitch of strand of 4.0 mm(S), twisting pitch of cord of 6.0 mm(S) and strength of cord of at least 165 Kg.

The side ply 14 is extended downwardly from a position which is nearer to the tread than the upper end 7' of the turn-up portion 7 of the carcass ply 3 to a position which is nearer to the tread than the upper end 5' of the turn-up portion of the wire chafer 5. In a space defined by the bead core 6, carcass ply 3, side ply 14 and turn-up portion 7 of the carcass ply 3 are arranged a hard rubber stiffner 8 (Shore A hardness 84°) which is the same as that of the embodiment shown in FIG. 1 and a relatively soft rubber layer 9 (Shore A hardness 48°) superimposed about the hard rubber stiffner 8 and arranged between the turn-up portion 7 of the carcass ply 3 and the side ply 14. The soft rubber layer 9 serves to separate the turn-up portion 7 of the carcass ply 3 from the side ply 14.

Between the upper end 5' of the turn-up portion of the wire chafer 5 and the turn-up portion 7 of the carcass ply 3 is arranged a soft pad rubber layer 10 (Shore A hardness 58°).

The above mentioned tire construction is provided at its joint portion formed between the tread rubber layer 2 and the side wall and located immediately below the hump $h$ with a side projection 13 for preventing side cut failure.

As explained hereinbefore, the use of the measures described of upwardly extending the upper end 7' of the turn-up portion 7 of the carcass ply 3 in the sidewall provides the important advantage that any objectional side cut failure which has been encountered particularly with the OR tires can effectively be alleviated. In addition, since the upper end 7' of the turn-up portion 7 of the carcass ply 3 is arranged in that portion of rubber of the side projection 13 which is large in thickness, this upper end 7' can be protected from being subjected to external damage.

As can be seen from the above, the invention provides a tire construction which is possessed of improved load bearing ability required for large size tire for heavy load vehicles and improved durability and side cut resistant property under service conditions.

What is claimed is:

1. In a radial tire for heavy load vehicles having a crown portion forming a tread, a pair of side portions for supporting the crown portion, each side portion having a root, a pair of bead portions each having a bead core and for mounting the root of each side portion on a tire rim, a carcass ply composed of a steel cord ply extending from the crown portion through both the side portions to both the bead portions, the carcass ply being wound around the bead core from the inside toward the outside thereof to form a turn-up portion, a chafer composed of a steel cord ply superimposed about the turn-up portion of the carcass ply, said chafer being wound around the bead core from the inside toward the outside thereof to reinforce the bead portion, and a plurality of inextensible belts superimposed about the carcass ply and reinforcing the crown portion, the improvement comprising: upwardly extending the upper end of the turn-up portion of the carcass ply to a position located between a point passing over the maximum width point of the carcass ply expanded by applying an internal pressure to the tire and a point where a normal drawn perpendicular from a hump to the carcass ply crosses with the carcass ply and reinforcing the side portion of the tire, and a soft rubber layer separating the turn-up portion of the carcass ply from the carcass ply, said soft rubber layer composed of rubber having a Shore A hardness which is smaller than a Shore A hardness of a coating rubber of the carcass ply and a 300% modulus of elasticity which is 50% to 85% of a 300% modulus of elasticity of the coating rubber of the carcass ply.

2. A radial tire according to claim 1, wherein the chafer is composed of a steel cord ply and the turn-up portion of the chafer is separated from the turn-up portion of the carcass ply by means of a pad rubber layer composed of rubber having a Shore A hardness which is smaller than a Shore A hardness of a coating rubber of the carcass ply and a 300% modulus of elasticity which is 50% to 85% of a 300% modulus of elasticity of the coating rubber of the carcass ply.

3. A radial tire according to claim 1 and further comprising a supplementary textile chafer superimposed about the chafer composed of steel cord ply.

4. In a radial tire for heavy load vehicles having a crown portion forming a tread, a pair of side portions for supporting the crown portion, each side portion having a root, a pair of bead portions each having a bead core and for mounting the root of each side portion on a tire rim, a carcass ply composed of a steel cord ply extending from the crown portion through both the side portions to both the bead portions, the carcass ply being wound around the bead core from the inside toward the outside thereof to form a turn-up portion, a chafer composed of a steel cord ply superimposed about the turn-up portion of the carcass ply, said chafer being would around the bead core from the inside toward the outside thereof to reinforce the bead portion, and a plurality of inextensible belts superimposed about the carcass ply and reinforcing the crown portion, the improvement comprising: upwardly extending the upper end of the turn-up portion of the carcass ply to a position located between a point passing over the maximum width point of the carcass ply expanded by applying an internal pressure to the tire and a point where a normal drawn perpendicular from a hump to the carcass ply crosses with the carcass ply, a side ply reinforcing the side portion of the tire, said side ply superimposed about the carcass ply and composed of a rubberized metallic cord, and a soft rubber layer separating the turn-up portion of the carcass ply from the side ply said soft rubber layer composed of rubber having a Shore A hardness which is smaller than a Shore A hardness of a coating rubber of the carcass ply and a 300% modulus of elasticity which is 50% to 80% of a 300% modulus of elasticity of the coating rubber of the carcass ply.

5. A radial tire according to claim 4, wherein the chafer is composed of a steel cord ply and the turn-up portion of the chafer is separated from the turn-up portion of the carcass ply by means of a pad rubber layer composed of rubber having a Shore A hardness which is smaller than a Shore A hardness of a coating rubber of the carcass ply and a 300% modulus of elasticity which is 50% to 85% of a 300% modulus of elasticity of the coating rubber of the carcass ply.

6. A radial tire according to claim 4 and further comprising a supplementary textile chafer superimposed about the chafer composed of steel cord ply.

* * * * *